Figure 1:
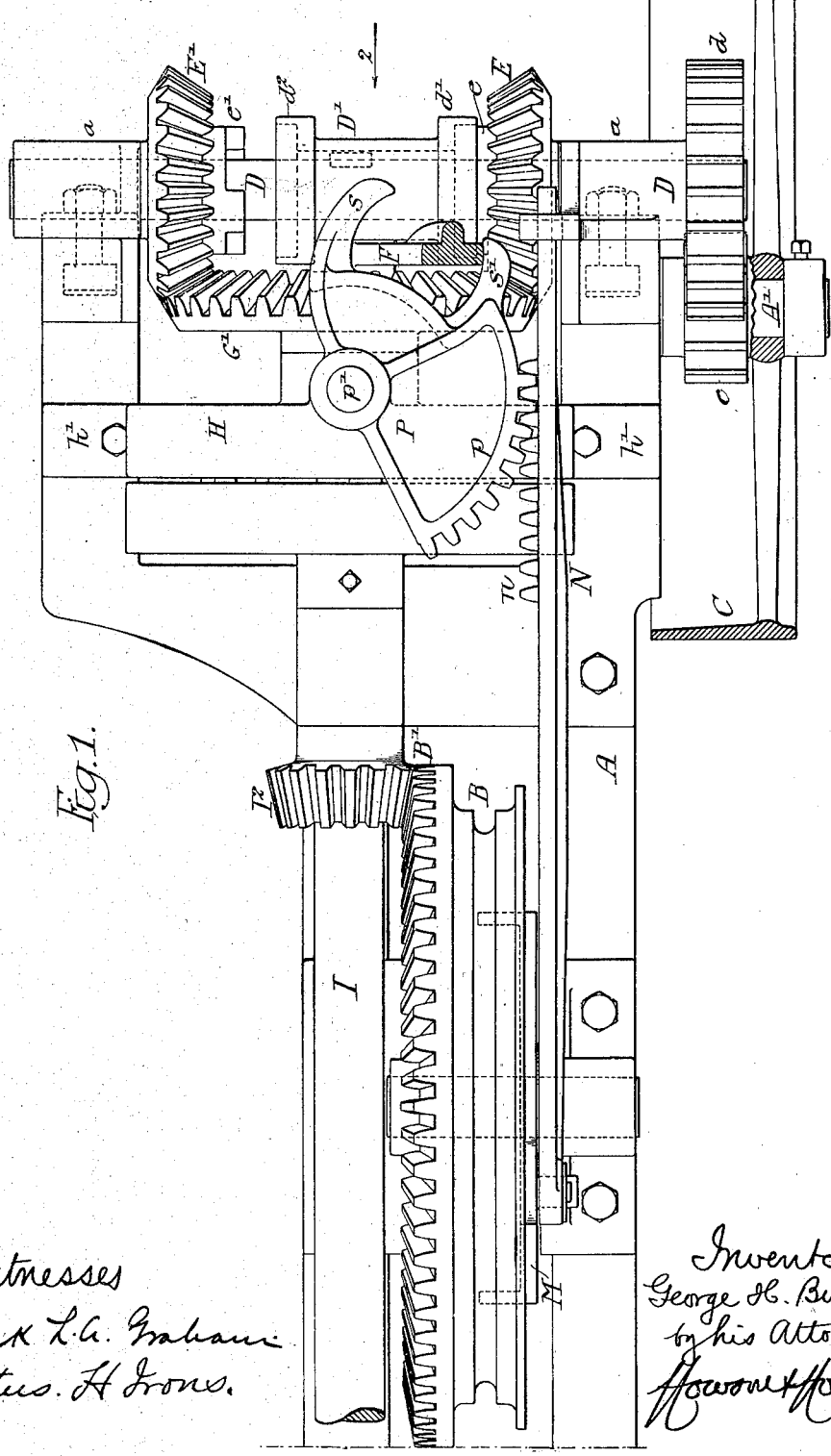

No. 736,208. PATENTED AUG. 11, 1903.
G. H. BURPEE.
MECHANICAL MOVEMENT.
APPLICATION FILED AUG. 27, 1902.
NO MODEL. 3 SHEETS—SHEET 1.

Witnesses
Frank L. A. Graham
Titus. H. Irons.

Inventor
George H. Burpee
by his Attorneys
Howson & Howson

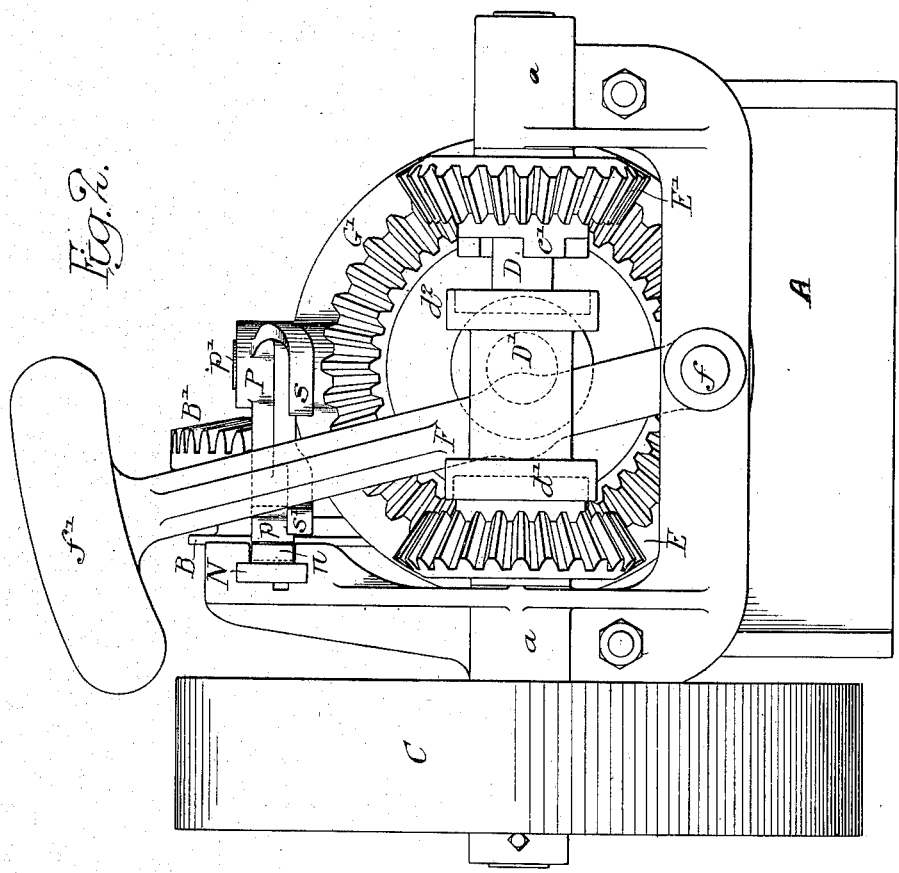

No. 736,208. PATENTED AUG. 11, 1903.
G. H. BURPEE.
MECHANICAL MOVEMENT.
APPLICATION FILED AUG. 27, 1902.
NO MODEL. 3 SHEETS—SHEET 3.
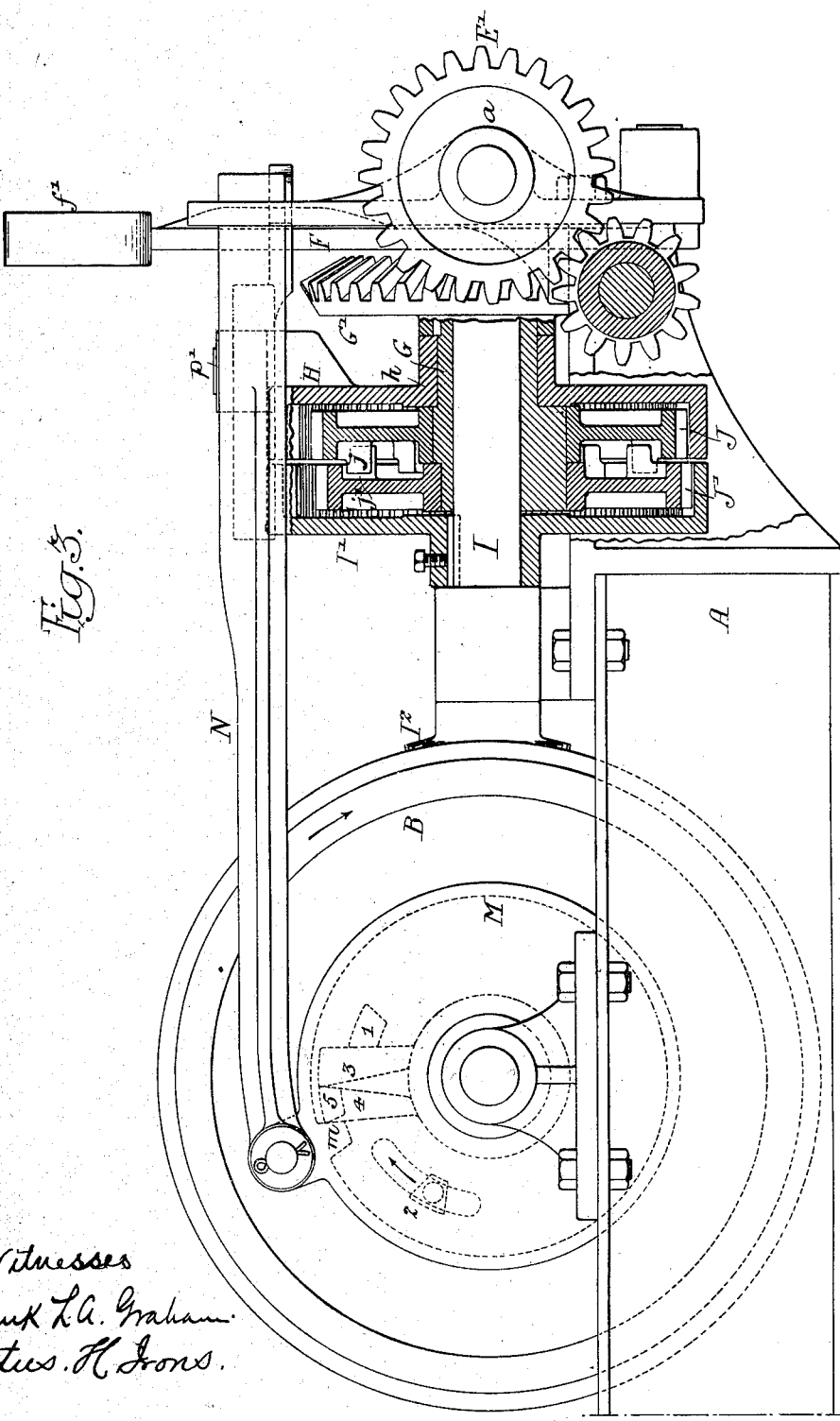

No. 736,208.                                        Patented August 11, 1903.

UNITED STATES PATENT OFFICE.

GEORGE H. BURPEE, OF PHILADELPHIA, PENNSYLVANIA, ASSIGNOR TO FUEL ECONOMIZER COMPANY OF AMERICA, OF CAMDEN, NEW JERSEY, A CORPORATION OF NEW JERSEY.

MECHANICAL MOVEMENT.

SPECIFICATION forming part of Letters Patent No. 736,208, dated August 11, 1903.

Application filed August 27, 1902. Serial No. 121,202. (No model.)

*To all whom it may concern:*

Be it known that I, GEORGE H. BURPEE, a citizen of the United States, residing in Philadelphia, Pennsylvania, have invented certain Improvements in Mechanical Movements, of which the following is a specification.

The object of my invention is to change a rotary motion into a reciprocating motion; and my invention relates particularly to mechanism for operating the scrapers of a fuel-economizer where it is desired to reciprocate the said scrapers up and down in contact with the circulating-tubes of the economizer.

In the accompanying drawings, Figure 1 is a plan view of my improved mechanical movement. Fig. 2 is an end view looking in the direction of the arrow 2, Fig. 1; and Fig. 3 is a side view, partly in section.

A is a frame.

B is a chain-wheel around which passes a chain extending in the present instance to the scrapers of the fuel-economizer.

C is a driving-pulley mounted on a stud $A'$, extending from the frame A and having a pinion $c$ cast on its hub, although it may be made separate and keyed thereto, if desired.

Meshing with the pinion $c$ is a gear-wheel $d$, secured to a shaft D, which is mounted in suitable bearings $a\,a$, secured to the frame A. Loose on the shaft D are two bevel gear-wheels E E', having, respectively, clutch-faces $e$ and $e'$, while keyed to said shaft D is a clutch-sleeve $D'$, having clutch-faces $d'\,d^2$, which are arranged to engage with either one of the clutch-faces $e\,e'$. This sleeve $D'$ is operated by a lever F, pivoted at $f$ to the frame and having a weight $f'$.

Meshing with the bevel gear-wheels E E' is a bevel gear-wheel $G'$, which is keyed to a sleeve G, having its bearings in the hub $h$ of a fixed internal gear-wheel H. This internal gear has lugs $h'$ securely fastened to the frame A.

On the shaft I is an internal gear-wheel $I'$, having a greater number of teeth than the internal gear H, and there is a pinion J meshing with the teeth of said wheel H and a pinion $J'$ meshing with the teeth of the wheel $I'$. These two pinions are loosely coupled together by lugs $j\,j'$, which interlock, as shown, the said pinions being loose on the sleeve G, which is made eccentric, one eccentric being greater than the other, so that both pinions will always mesh with their respective gears, and as they revolve one tooth in the present instance will be lost on each revolution, so that the shaft I will be driven from the shaft D very slowly.

On the shaft I is a bevel-pinion $I^2$, meshing with a bevel gear-wheel $B'$ on the chain-wheel B, which in the present instance is part of the casting of the bevel-gear, although they may be arranged independently, if desired.

In order to reverse the movement of the scrapers, two lugs 1 and 2 are provided on the wheel B, the lug 2 being adjustable in the present instance, and the hub of the wheel having two loose arms 3 and 4, the first only of which engages the said lugs 1 and 2. The arm 4 has a projection 5, with which the arm 3 engages, and there is a projection $m$ on a disk M, with which the arm 4 engages. The disk M is loose on the shaft and is connected to a rack-bar N, having rack-teeth $n$, which engage with the teeth $p$ of a segment P, pivoted at $p'$ to the fixed gear-casing H. On the segment P are two arms $s\,s'$, which engage the lever F, so as to shift the clutch-sleeve $D'$ into gear with either of the bevel-wheels E and $E'$.

The operation of the device is as follows: When the mechanism is set in motion, the wheel C is driven at the ordinary speed and drives the clutch-shaft D, which in turn drives the shaft I on the chain-wheel, the movement of the chain-drum being very slow. When the chain-drum has made two and a half revolutions in one direction, for example, the reversing mechanism shifts the clutch-sleeve $D'$, so as to reverse the direction of movement of the shaft I and the chain-wheel B. This movement can be applied to any mechanism where it is desired to convert a quick rotary motion into a slow intermittent rotary motion first in one direction and then in the reverse direction and is especially adapted for use in connection with the scrapers of fuel-economizers.

I claim as my invention—

1. The combination in a mechanical movement, of a driving and a driven shaft, a clutch on one of the shafts, means constructed to be actuated through said clutch for operating the other shaft in either direction, means for shifting the clutch, said means including a rack-rod, a gear meshing therewith, and a lever controlled by the gear and operative upon the clutch, substantially as described.

2. The combination of a wheel C, a shaft D geared thereto, two bevel-gears on the shaft, a clutch-sleeve between the bevel-gears and arranged to engage either of the same, a bevel gear-wheel common to the said gears, a shaft driven from the bevel-gears, reducing-gear between the shaft and the gear whereby the shaft is made to rotate slowly, and mechanism for shifting the clutch-sleeve, substantially as described.

3. The combination in a mechanical movement, of a driven shaft having two bevel-gears loosely carried thereon, a sleeve on the shaft arranged to be clutched to either bevel-gear, a bevel-wheel gearing with both of said bevel-gears, a sleeve carrying said bevel gear-wheel, two eccentrics on the sleeve, a gear-wheel on each eccentric, two internal gear-wheels, one having a greater number of teeth than the other, one of said gear-wheels being fast to the frame, a shaft secured to the other gear-wheel, shifting mechanism connected to the clutch-sleeve, whereby when the driven shaft has turned a certain number of revolutions it will be automatically reversed, substantially as described.

4. The combination of a driving-shaft, a clutch-sleeve, two bevel-gears loose on the said shaft and arranged to be clutched to said sleeve, a second sleeve, a gear-wheel thereon meshing with both gear-wheels of the driving-shaft, two eccentrics on the second sleeve, a gear-wheel having lugs on each eccentric, said lugs interlocking so that they will turn together, two internal gear-wheels, of which one is fast to the frame, a shaft secured to the other internal gear-wheel, a bevel-pinion on the said shaft, a bevel gear-wheel meshing with the pinion, two lugs on the bevel-wheel, two arms on the shaft of the said gear-wheel, a lug on one of said arms, a disk, a lug thereon, the parts being arranged so that the lugs on the gear-wheel will engage with one arm and that arm will engage the other arm, and the second arm will engage the lug on the disk, with a rack-bar connected to the disk, a segment gearing with the rack-bar and having arms, and a shifting-lever actuating the clutch-sleeve and actuated by the segment, substantially as described.

In testimony whereof I have signed my name to this specification in the presence of two subscribing witnesses.

GEORGE H. BURPEE.

Witnesses:
WILL. A. BARR,
JOS. H. KLEIN.